United States Patent
Zhou

(10) Patent No.: US 8,108,701 B2
(45) Date of Patent: Jan. 31, 2012

(54) POWER SUPPLY CIRCUIT

(75) Inventor: Hai-Qing Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 360 days.

(21) Appl. No.: 12/577,717

(22) Filed: Oct. 12, 2009

(65) Prior Publication Data

US 2011/0068760 A1 Mar. 24, 2011

(30) Foreign Application Priority Data

Sep. 18, 2009 (CN) .......................... 2009 1 0307266

(51) Int. Cl.
*G06F 1/00* (2006.01)

(52) U.S. Cl. .................. 713/300; 323/273; 323/901

(58) Field of Classification Search .................. 323/222, 323/226, 266–268, 272–276, 282–285, 901; 713/300, 310, 320, 324, 321
See application file for complete search history.

(56) References Cited

U.S. PATENT DOCUMENTS

| | | | | |
|---|---|---|---|---|
| 4,543,522 A | * | 9/1985 | Moreau | 323/303 |
| 5,300,877 A | * | 4/1994 | Tesch | 323/313 |
| 5,852,359 A | * | 12/1998 | Callahan et al. | 323/274 |
| 5,939,870 A | * | 8/1999 | Nguyen et al. | 323/282 |
| 6,188,210 B1 | * | 2/2001 | Tichauer et al. | 323/273 |
| 7,590,874 B2 | * | 9/2009 | Chen | 713/300 |
| 7,802,115 B2 | * | 9/2010 | Tsai | 713/310 |

* cited by examiner

*Primary Examiner* — Rajnikant Patel
(74) *Attorney, Agent, or Firm* — Altis Law Group, Inc.

(57) ABSTRACT

A power supply circuit arranged in a circuit board to supply a determined voltage to an element is disclosed. The power supply circuit includes two voltage receiving terminals to receive voltage signals, a window comparator, and an electrical switch. The comparator drives the electrical switch to be turned on, therefore a terminal of the electrical switch stably output the determined voltage to the element.

10 Claims, 1 Drawing Sheet

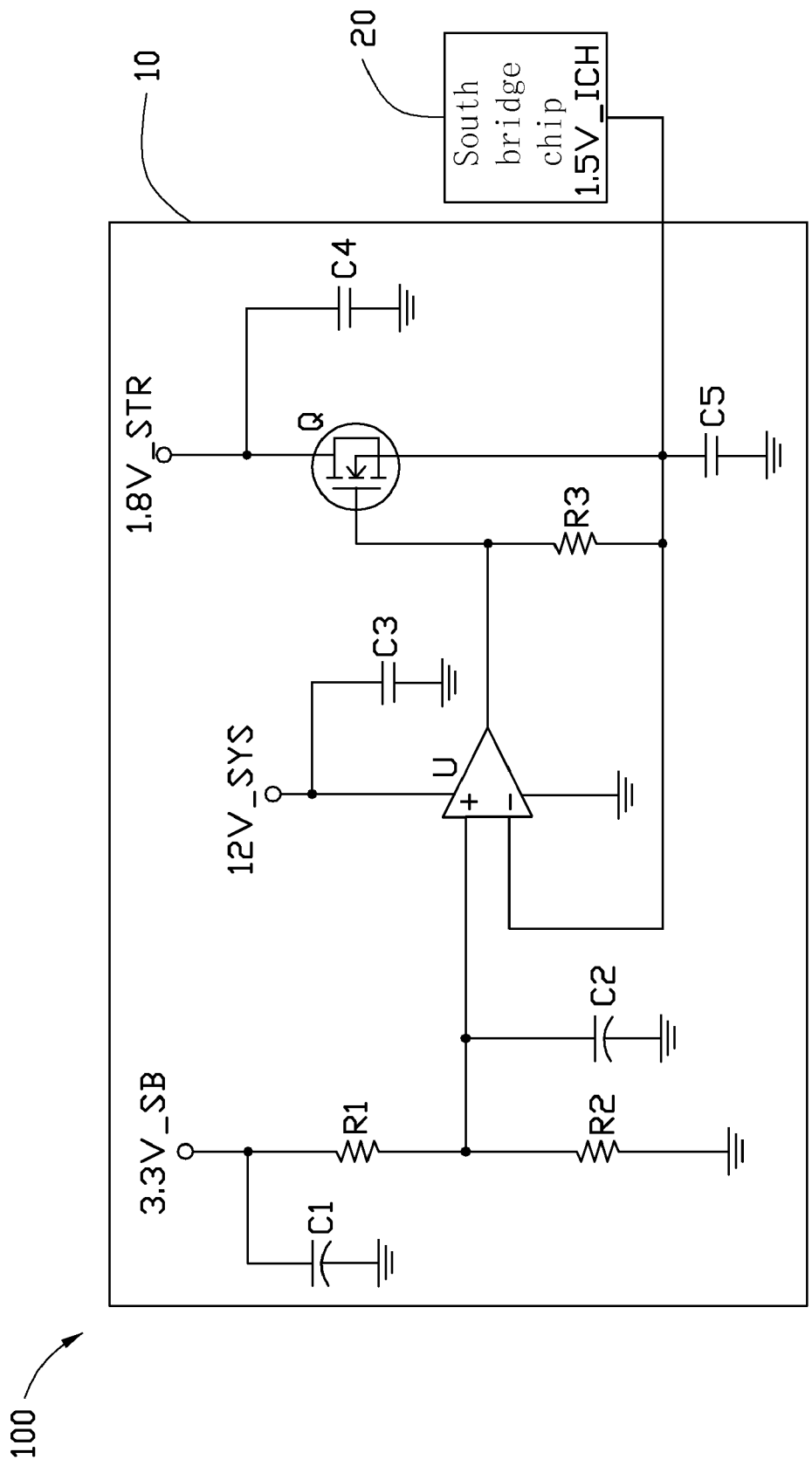

POWER SUPPLY CIRCUIT

BACKGROUND

1. Technical Field

The present disclosure relates to power supply circuits and, particularly, to a power supply circuit to supply a voltage to an element of a circuit board.

2. Description of Related Art

Most motherboards include south bridge chips. Power supply circuits provide voltages to the south bridge chips. These power supply circuits may include some voltage converting chips. However, these voltage converting chips are very expensive and complicated. A low-cost power supply circuit is therefore desirable.

BRIEF DESCRIPTION OF THE DRAWING

The drawing is a circuit diagram of an exemplary embodiment of a power supply circuit.

DETAILED DESCRIPTION

Referring to the drawing, an exemplary embodiment of a power supply circuit 10 is arranged in a motherboard 100 to supply a 1.5V voltage to a south bridge chip 20. The power supply circuit 10 includes a 3.3V voltage receiving terminal 3.3V_SB, a 12V voltage receiving terminal 12V_SYS, a 1.8V voltage receiving terminal 1.8V_STR, a window comparator U, an electrical switch such as a field-effect transistor (FET) Q, a divider circuit including two resistors R1 and R2, a resistor R3, and five capacitors C1-C5. The 3.3V voltage receiving terminal 3.3V_SB is used to receive a 3.3V voltage signal from the motherboard 100. The 12V voltage receiving terminal 12V_SYS is used to receive a 12V voltage signal from the motherboard 100. The 1.8V voltage receiving terminal 1.8V_STR is used to receive a 1.8V voltage signal from the motherboard 100. In one embodiment, the 3.3V, 12V, and 1.8V voltage signals are respectively a 3.3V standby voltage signal, a 12V system voltage signal, and a 1.8V memory voltage signal of the motherboard 100.

The 3.3V voltage receiving terminal 3.3V_SB is grounded via the capacitor C1, and connected to a first terminal of the resistor R1. A second terminal of the resistor R1 is grounded via the resistor R2 and the capacitor C2, which are connected in parallel. A node between the resistor R1 and the resistor R2 is connected to a non-inverting terminal of the comparator U. A power terminal of the comparator U is connected to the 12V voltage receiving terminal 12V_SYS, and grounded via the capacitor C3. A ground terminal of the comparator U is grounded. An inverting terminal of the comparator U is connected to a 1.5V voltage pin 1.5V_ICH of the south bridge chip 20. An output terminal of the comparator U is connected to a gate of the FET Q, and connected to the 1.5V voltage pin 1.5V_ICH of the south bridge chip 20 via the resistor R3. A source of the FET Q is connected to the 1.5V voltage pin 1.5V_ICH of the south bridge chip 20. A drain of the FET Q is connected to the 1.8V voltage receiving terminal 1.8V_STR, and grounded via the capacitor C4. The capacitor C5 is connected between the 1.5V voltage pin 1.5V_ICH of the south bridge chip 20 and ground. A voltage drop between the source and drain of the FET Q is 0.3V when the FET Q is turned on. Resistances of the resistors R1 and R2 satisfy the voltage of the non-inverting terminal of the comparator U, which is approximately 1.5V.

When the motherboard 100 is powered on, the 3.3V, 12V, and 1.8V voltage receiving terminals 3.3V_SB, 12V_SYS, and 1.8V_STR respectively receive the 3.3V, 12V, and 1.8V voltage signals from the motherboard 100. The comparator U outputs a high voltage signal, such as 3V, to the gate of the FET Q to turn on the FET Q. Because the voltage drop between the source and drain of the FET Q is 0.3V when the FET Q is turned on, the voltage of the source of the FET Q is equal to 1.8V−0.3V=1.5V. The 1.5V voltage pin 1.5V_ICH of the south bridge chip 20 receives the 1.5V voltage signal of the source of FET Q. Because the inverting terminal of the comparator U receives a 1.5V feedback signal from the 1.5V voltage pin 1.5V_ICH of the south bridge chip 20, the non-inverting terminal of the comparator U is approximately 1.5V, and because the comparator U is a window comparator, thereby the 1.5V voltage signal of the source of FET Q is stable. Furthermore, output currents from the comparator U and the FET Q are very large, thereby the power supply circuit 10 can drive a great load. In other embodiments the capacitors C1-C5 can be omitted to save costs.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A power supply circuit arranged in a circuit board to supply a determined voltage to an element, the power supply circuit comprising:
   a first voltage receiving terminal to receive a first voltage signal, wherein the first voltage receiving terminal is connected to a divider circuit;
   a second voltage receiving terminal to receive a second voltage signal;
   a voltage output terminal outputting the determined voltage to the element;
   a window comparator, wherein a non-inverting terminal of the window comparator is connected to the divider circuit, an inverting terminal of the comparator is connected to the voltage output terminal; and
   an electrical switch, wherein an output terminal of the comparator is connected to a control terminal of the electrical switch, and connected to the voltage output terminal via a resistor, a first terminal of the electrical switch is connected to the voltage output terminal, a second terminal of the electrical switch is connected to the second voltage receiving terminal;
   wherein the second voltage signal minus a voltage drop between the first terminal and the second terminal of the electrical switch equals the determined voltage, the divider circuit satisfy the voltage of the non-inverting terminal of the comparator equals to the determined voltage.

2. The power supply circuit of claim 1, wherein the circuit board is a motherboard, the first voltage signal is a 3.3V standby voltage of the circuit board.

3. The power supply circuit of claim 1, wherein the circuit board is a motherboard, the second voltage signal is a 1.8V voltage of the circuit board, the voltage drop between the first terminal and the second terminal of the electrical switch is 0.3V.

4. The power supply circuit of claim 3, wherein the circuit board is a motherboard, the 1.8V voltage signal is a memory voltage signal of the circuit board.

5. The power supply circuit of claim 1, wherein the circuit board is a motherboard, a voltage terminal of the window comparator is connected to a third voltage receiving terminal to receive a 12V system voltage signal of the circuit board.

6. The power supply circuit of claim 5, wherein the first to third voltage receiving terminals are respectively grounded via three capacitors.

7. The power supply circuit of claim 1, wherein the voltage output terminal is ground via a capacitor.

8. The power supply circuit of claim 1, wherein the non-inverting terminal of the comparator is ground via a capacitor.

9. The power supply circuit of claim 1, wherein the divider circuit includes a first resistor and a second resistor, the first voltage receiving terminal is connected to a first terminal of the first resistor, a second terminal of the first resistor is grounded via a second resistor, a node between the first and second resistors is connected to the non-inverting terminal of the comparator.

10. The power supply circuit of claim 1, wherein the electrical switch is a field-effect transistor (FET), a gate of the FET is the control terminal of the electrical switch, a source of the FET is the first terminal of the electrical switch, a drain of the FET is the second terminal of the electrical switch.

* * * * *